United States Patent
Shapoury

(10) Patent No.: US 10,686,251 B2
(45) Date of Patent: Jun. 16, 2020

(54) WIDEBAND BEAM BROADENING FOR PHASED ARRAY ANTENNA SYSTEMS

(71) Applicant: THE BOEING COMPANY, Chicago, IL (US)

(72) Inventor: Alireza Shapoury, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 262 days.

(21) Appl. No.: 15/413,175

(22) Filed: Jan. 23, 2017

(65) Prior Publication Data
US 2018/0358696 A1 Dec. 13, 2018

(51) Int. Cl.
*H01Q 3/00* (2006.01)
*H01Q 3/36* (2006.01)
*H01Q 25/00* (2006.01)
*H01Q 3/24* (2006.01)
*H01Q 21/22* (2006.01)
(Continued)

(52) U.S. Cl.
CPC .......... *H01Q 3/36* (2013.01); *H01Q 3/24* (2013.01); *H01Q 25/002* (2013.01); *G01S 13/90* (2013.01); *G01S 2013/0263* (2013.01); *H01Q 3/26* (2013.01); *H01Q 21/0025* (2013.01); *H01Q 21/06* (2013.01); *H01Q 21/22* (2013.01)

(58) Field of Classification Search
CPC .......... H01Q 3/36; H01Q 3/24; H01Q 3/247; H01Q 21/0025; H01Q 21/22; H04B 7/0602; H04B 7/0686; H04B 7/0695

USPC .................................. 342/372, 374
See application file for complete search history.

(56) References Cited

U.S. PATENT DOCUMENTS 4,178,581 A * 12/1979 Willey, Sr. ............. G01S 1/14
342/368
4,425,567 A * 1/1984 Tresselt ................ H01Q 25/02
342/373
(Continued)

OTHER PUBLICATIONS

Aarts, et al., "On analytic design of loudspeaker arrays with uniform radiation characteristics", The Journal of the Acoustical Society of America, vol. 107, No. 1, Jan. 2000, pp. 287-292.
(Continued)

*Primary Examiner* — Chuong P Nguyen
(74) *Attorney, Agent, or Firm* — Moore Intellectual Property Law, PLLC

(57) ABSTRACT

A multi-mode phased array antenna ("MPAA") is disclosed. The MPAA has at least two modes of operation, where a first mode of operation produces a first main-beam and a second mode of operation produces a second beam. The MPAA includes a plurality of radiating elements arranged as an array of radiating elements and a controller in signal communication with the plurality of radiating elements. The controller is configured to excite the plurality of radiating elements to produce a first radiation pattern having the first main-beam in the first mode of operation and a second radiation pattern having the second beam in the second mode of operation. The second beam is wider than the first main-beam and the second radiation pattern is similar to a radiation pattern for a single radiating element of the plurality of radiating elements. The controller also switches between the first mode and second mode of operation.

20 Claims, 10 Drawing Sheets

(51) Int. Cl.
  *H01Q 21/06* (2006.01)
  *H01Q 3/26* (2006.01)
  *G01S 13/90* (2006.01)
  *G01S 13/02* (2006.01)
  *H01Q 21/00* (2006.01)

(56) References Cited

U.S. PATENT DOCUMENTS

| | | | | |
|---|---|---|---|---|
| 4,626,858 A * | 12/1986 | Copeland | ............. | H01Q 25/002 342/363 |
| 5,389,939 A * | 2/1995 | Tang | ............. | H01Q 3/46 343/753 |
| 6,218,987 B1 * | 4/2001 | Derneryd | ............. | H01Q 1/246 342/373 |
| 6,583,760 B2 * | 6/2003 | Martek | ............. | H01Q 1/523 342/373 |
| 6,833,812 B2 * | 12/2004 | Diament | ............. | H01Q 1/523 342/372 |
| 7,664,533 B2 * | 2/2010 | Logothetis | ............. | H01Q 1/246 342/368 |
| 9,413,448 B2 * | 8/2016 | Ashrafi | ............. | H04B 7/0697 |
| 9,843,111 B2 * | 12/2017 | Ying | ............. | H01Q 3/24 |
| 10,158,173 B2 * | 12/2018 | Foo | ............. | H01Q 3/40 |
| 2005/0232057 A1 * | 10/2005 | Hansen | ............. | H01Q 25/02 365/230.01 |
| 2013/0321207 A1 * | 12/2013 | Monogioudis | ............. | H01Q 1/246 342/373 |
| 2016/0322714 A1 * | 11/2016 | Ying | ............. | H01Q 3/24 |
| 2018/0309496 A1 * | 10/2018 | Lee | ............. | H04L 5/0044 |
| 2019/0081688 A1 * | 3/2019 | Deenoo | ............. | H04B 7/0695 |

OTHER PUBLICATIONS

Extended European Search Report dated May 15, 2018 in EP Application No. EP20170208555, 9 pages.

* cited by examiner

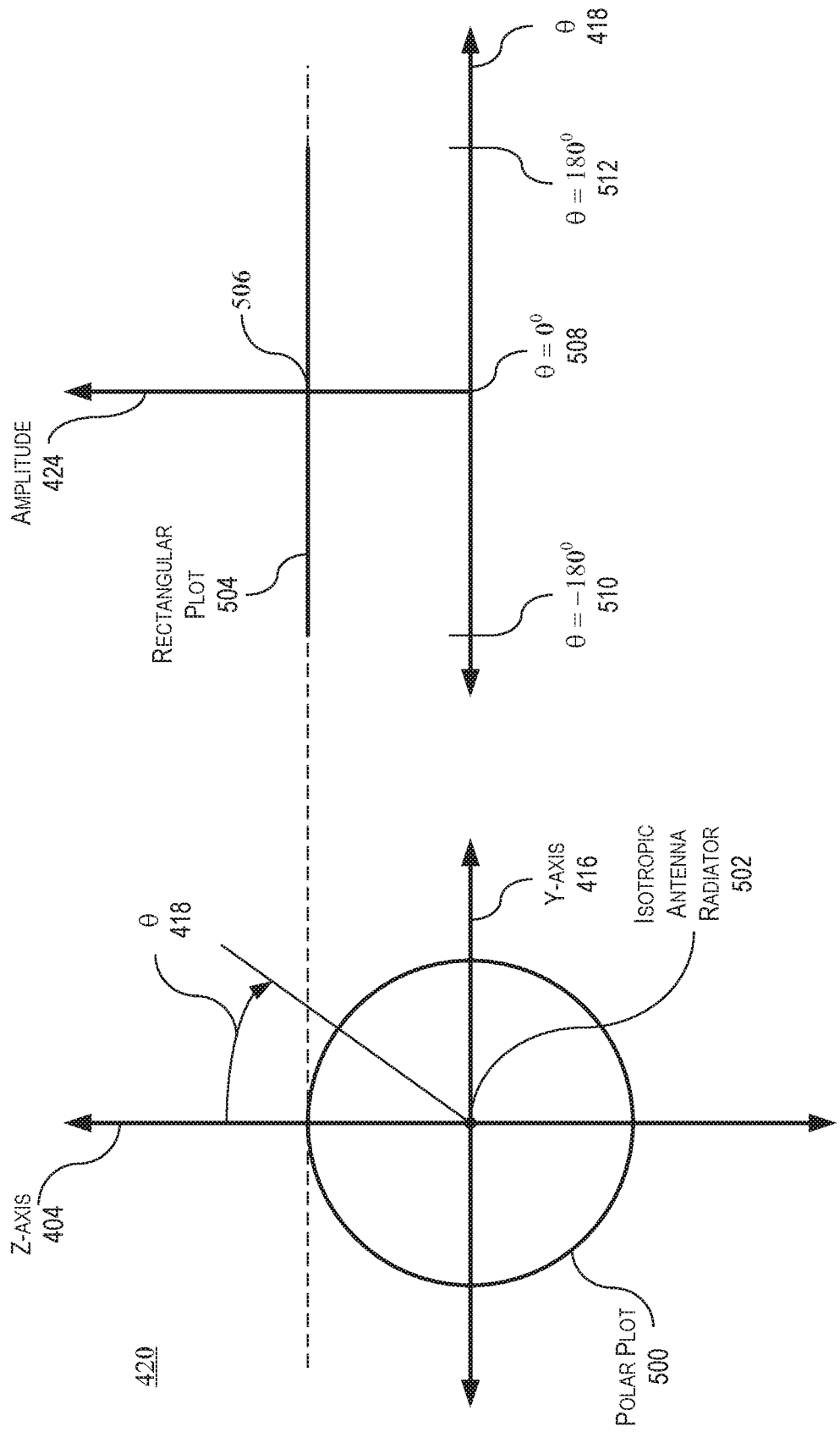

WIDEBAND BEAM BROADENING FOR PHASED ARRAY ANTENNA SYSTEMS

BACKGROUND

1. Field

The present disclosure is related to antennas systems, and in particular, to phased array antennas.

2. Related Art

At present, the utilization of phased array antennas ("PAAs" also known as "phased arrays," "array antennas," "electronically scanned array antennas," or simply, "an array") for modern communication and radar systems have become more common. In general, a PAA includes a large plurality of transmit or radiating ("transmit/receive" or "T/R") elements where the T/R elements are such designed to result in deliberate electrical phase, amplitude and temporal relationships between each other. The PAA produces a far-field radiation pattern having beams that are formed by controlling the spectrum, timing, amplitude and phase of the signal emitted from each T/R element so as to provide constructive superposition or destructive interference of the total number of emitted signals from the plurality of T/R elements. In general, the interactions of the total number of emitted signals forms and steers the beams in different directions, where the directions of the beams are determined by controlling the amplitude and phase shift of the signal emitted from each T/R element instead of physically moving the PAA. It is appreciated by those ordinary skill in the art that phase control is performed through phase shifters and true time delay components, amplitude control is performed through attenuators or amplifiers and timing and spectrum control is governed by a PAA controller, a transceiver, and characteristics of PAA radiating elements and transmission lines.

Similarly in the receive mode (based on the reciprocity of reception and transmission), by controlling the phase and amplitude, the PAA can receive signals from a desired direction. There are a number of different types of arrangements for PAA that may include, for example, linear arrays, planar arrays, frequency scanning arrays, phase-increment calculating arrays, etc. that may be utilized for different applications.

A common characteristic of PAAs is that as the number of T/R elements increase, so does the directivity of PAA, where the directivity of an antenna is a description of how an antenna concentrates energy in one direction in preference to radiation in other directions. In general, the directivity of an antenna is equal to the power gain of the antenna if the antenna has 100% radiation efficiency. In the resulting far-field radiation pattern produced by the PAA, the far-field radiation pattern typically includes a main-lobe (i.e., a main-beam or major-lobe) containing the maximum radiation in a given direction and minor-lobes (i.e., side-lobes) containing lesser radiation in other directions. It is appreciated by those of ordinary skill in the art that as number of T/R elements increase in a PAA the directivity of PAA increases and, resultantly, the width of the main-beam decreases.

Unfortunately, as width of the main-beam decreases, the main-beam becomes too narrow for efficient implementation of some types of communication or radar applications that include, for example, radar search functions, null filing, floodlight mode illumination, and synthetic aperture radar ("SAR"). As an example, in radar search functions, the main-beam may be so narrow that frame times becomes prohibitively long compared to the searched volume, in floodlight mode illumination applications where a missile is launched without a lock or the lock is lost during the missile time of flight, at endgame stage as the range is closing to zero where very high lateral accelerations might be used and update rates need to increase, and where the main-beam is too narrow compared with the target complex that is being illuminated to provide a wide beam to capture, re-capture, or lock on to the target of the missile. Furthermore, it has application in null filing for multi-beam, or switched-beam radar or communication antenna with orthogonal waveforms, where a PAA has nulls in its far-field radiation pattern between the lobes of the far-field radiated beams that need to be mitigated so as to maintain radar operation or preserve some level of communication with other devices. Moreover, in SAR applications, large beam-widths are typically utilized to illuminate an object or location on the ground that is linearly traversed by the SAR beam for an extended period of time. In all of these examples, there is a need for broader (i.e., wider) main-beam than what is typically produced by PAAs having a large number of T/R elements. Attempts to solve these problems have included utilizing beam spoiling techniques to shape and broaden the main-beams of known PAAs, however, the known beam spoiling techniques still do not provide wide enough beams for wideband systems to solve these problems. Therefore, there is a need for an improved system and method to address these problems.

SUMMARY

A multi-mode phased array antenna ("MPAA") is disclosed. The MPAA has at least two modes of operation, where a first mode of operation produces a first main-beam and a second mode of operation produces a second beam. The MPAA includes a plurality of radiating elements arranged as an array of radiating elements and a controller in signal communication with the plurality of radiating elements. The controller is configured to excite the plurality of radiating elements to produce a first radiation pattern having the first main-beam in the first mode of operation and a second radiation pattern having the second beam in the second mode of operation. The second beam is wider than the first main-beam and the second radiation pattern is similar to a radiation pattern for a single radiating element of the plurality of radiating elements. The controller is also configured to switch between at least the first mode of operation and the second mode of operation.

In an example of operation, the MPAA performs a method for widening the main-beam of the first radiation pattern. The method includes exciting the plurality of radiating elements to produce the second radiation pattern, where the second radiation pattern is similar to the radiation pattern of a single radiating element of the plurality of radiating elements and where the second radiation pattern has the second beam that is wider than the main-beam of the first radiation pattern.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 5A is a plot of an example of an implementation of a polar plot of a far-field radiation pattern of an isotropic antenna radiator.

FIG. 5B is a rectangular plot of the polar plot of the far-field radiation pattern shown in FIG. 5A.

DETAILED DESCRIPTION

Disclosed is a multi-mode phased array antenna ("MPAA"). The MPAA has at least two modes of operation, where a first mode of operation produces a first main-beam and a second mode of operation produces a second beam. The MPAA includes a plurality of radiating elements arranged as an array of radiating elements and a controller in signal communication with the plurality of radiating elements. The controller is configured to excite the plurality of radiating elements to produce a first radiation pattern having the first main-beam in the first mode of operation and a second radiation pattern having the second beam in the second mode of operation. The second beam is wider than the first main-beam and the second radiation pattern is similar to a radiation pattern for a single radiating element of the plurality of radiating elements. The controller is also configured to switch between at least the first mode of operation and the second mode of operation.

In an example of operation, the MPAA performs a method for widening the main-beam of the first radiation pattern. The method includes exciting the plurality of radiating elements to produce the second radiation pattern, where the second radiation pattern is similar to the radiation pattern of a single radiating element of the plurality of radiating elements and where the second radiation pattern has the second beam that is wider than the main-beam.

Figure 1:
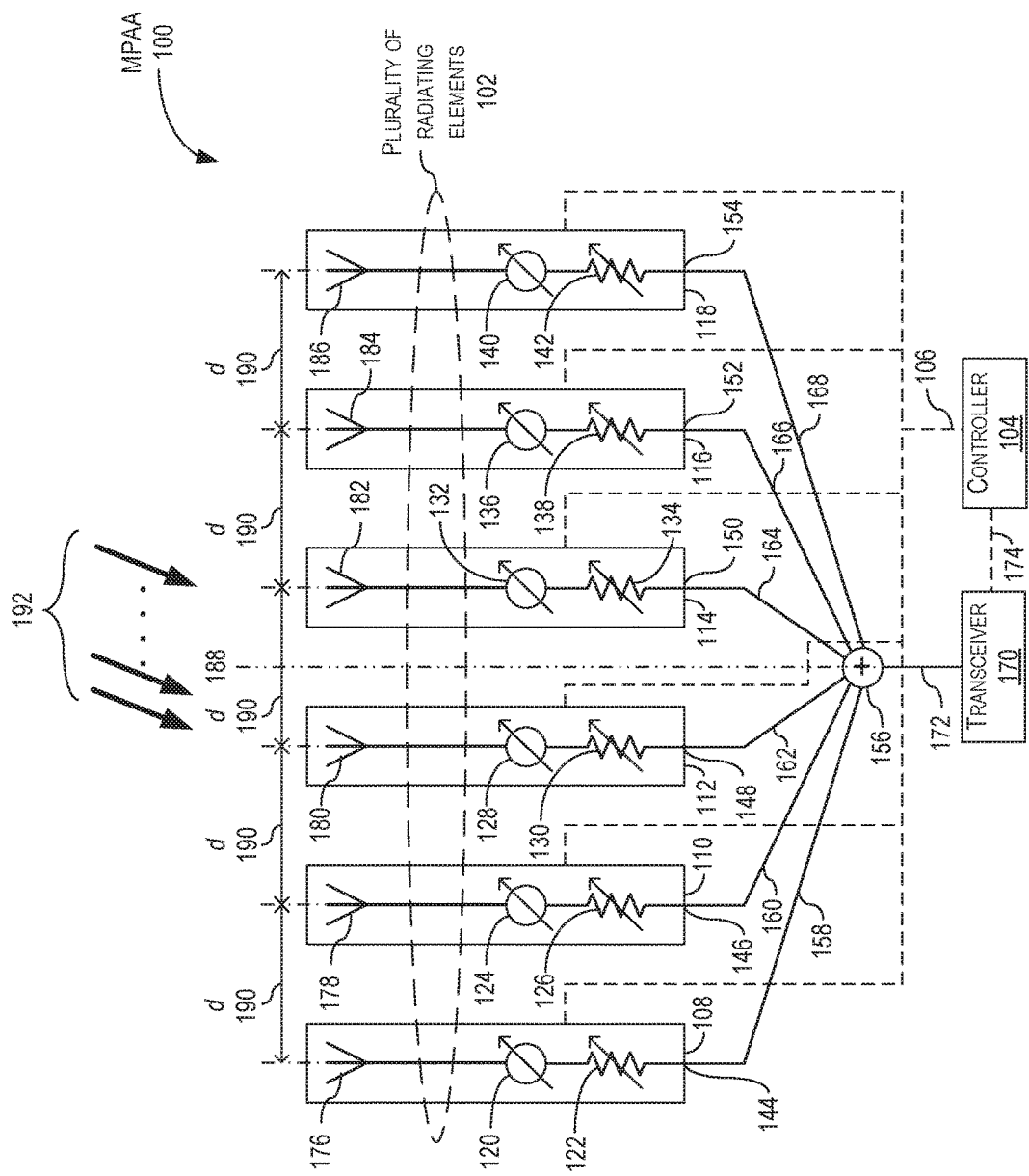
FIG. 1 is a system diagram of an example of an implementation of multi-mode phased array antenna ("MPAA") in accordance with the present disclosure.

In FIG. 1, a system diagram of an example of an implementation of the MPAA 100 is shown in accordance with the present disclosure. The MPAA 100 includes a plurality of radiating elements 102 arranged as an array of radiating elements that may be linear (i.e., one-dimensional), planar (i.e., two-dimensional), or conformal (i.e., three-dimensional) and a controller 104 in signal communication with the plurality of radiating elements 102 via signal path 106. In this example, the signal path 106 may be a signal bus (e.g., computer bus) that is in signal communication with each radiating element 108, 110, 112, 114, 116, and 118 (also known as "array radiating elements" or "array elements"), respectively, of the plurality of radiating elements 102. The output of each radiating element 108, 110, 112, 114, 116, and 118 may be controlled in spectrum, timing, amplitude and phase via the controller 104, where each radiating element 108, 110, 112, 114, 116, and 118 includes e.g., a phase-shifter 120, 124, 128, 132, 136, and 140 and e.g., an attenuator 122, 126, 130, 134, 138, and 142, respectively. The terminals 144, 146, 148, 150, 152, and 154 of each radiating element 108, 110, 112, 114, 116, and 118 is in signal communication with a combiner/feed network 156 via signal paths 158, 160, 162, 164, 166, and 168, respectively. In this example, a transceiver 170 may also be in signal communication with both the combiner/feed network 156 and controller 104 via signal paths 172 and 174, respectively. In this example, each radiating element 108, 110, 112, 114, 116, and 118 may be a transmit/receive ("T/R") module. Additionally, each of the radiating elements may include an individual radiator 176, 178, 180, 182, 184, and 186 which may be, for example, a dipole, aperture, patch, or other type of individual antenna radiating element.

It is appreciated by those skilled in the art that the circuits, components, modules, and/or devices of, or associated with, the MPAA 100, radiating element 108, 110, 112, 114, 116, and 118, and controller 104 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, optical fibers, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the plurality of radiating elements 102 has an array center 188 that corresponds to the physical center of the plurality of radiating elements 102 where each radiating element pair (i.e., 108 and 110, 110 and 112, 112 and 114, 114 and 116, and 116 and 118) of the plurality of radiating elements 102 is spaced apart by an inter-radiating element distance 190 (referred to here as "d" 190) the same amount (i.e., an equally spaced array). In this example, the array center 188 is shown at the half-way distance (i.e., half of between the two radiating elements 112 and 114). Typical lengths for the spacing d 190 may include, for example, a quarter, a half, and a full wavelength of operation which corresponds to a center-frequency of operation of the MPAA 100. In this example, it is appreciated by those of ordinary skill in the art that only six (6) radiating elements 108, 110, 112, 114, 116, and 118 are shown in the plurality of radiating elements 102 for the purpose of ease of illustration; however, the actual number of radiating elements may be less than, more, or significantly more than six based on the design of the MPAA 100, furthermore the radiating elements do not necessarily need to be evenly spaced from each other. As an example, the MPAA 100 may include more than a thousand radiating elements in some designs where the spacing between some of the elements may not necessarily be similar due to design (e.g., sparsely populated antenna array such as, for example, a minimum redundancy linear array ("MRLA")) or mechanical constraints such as mounting supports. It is also appreciated by those of ordinary skill in the art that as the length of a linear portion of the plurality of radiating elements 102 increases, for long arrays the beam-width (i.e., the width of the main-beam) between first nulls ("BWFM") (i.e., the areas of the radiation pattern where the array factor first goes to zero on both the positive and negative sides of the main-lobe) is approximately equal to two-times (i.e., 2×) the wavelength of operation divided by the product of the total number of radiating elements (of the plurality of radiating elements 102) and the spacing d 190 between the radiating elements. Written as an equation, the BWFN is related to the wavelength ("λ") of operation, number of radiating elements ("N") of the plurality of radiating elements 102, and spacing d 190 as follows:

$$BWFN \approx \frac{2\lambda}{Nd}.$$

Figure 2:
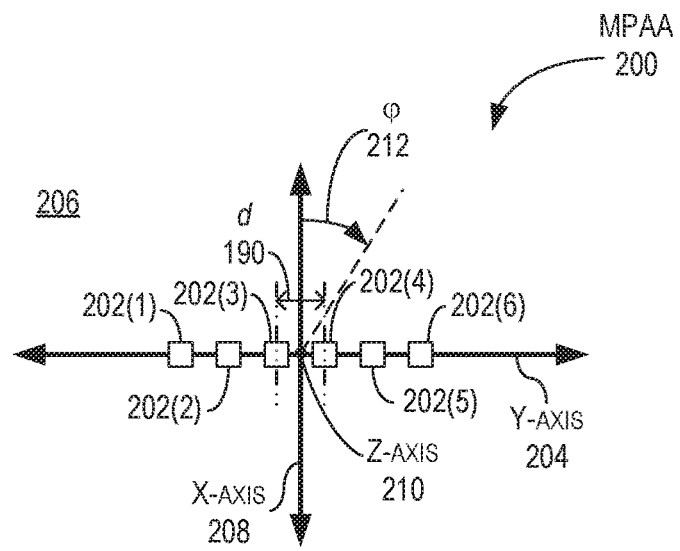
FIG. 2 is a top-view of an example of an implementation of an example of a linear (i.e., one-dimensional) MPAA.

In FIG. 2, a top-view of an example of an implementation of an example of a linear (i.e., one-dimensional) MPAA 200 is shown. In this example, the MPAA 200 includes six (6) radiating elements 202(1), 202(2), 202(3), 202(4), 202(5), and 202(6) along a Y-axis 204 in a X-Y plane 206 defined by the Y-axis 204 and an X-axis 208. As discussed earlier, only six (6) radiating elements 202(1), 202(2), 202(3), 202(4), 202(5), and 202(6) are shown for the purpose of illustration but it is appreciated by those of ordinary skill in the art that the number radiating elements may vary from two to a large number (e.g., greater than a 1,000). In this example, all of the radiating elements 202(1), 202(2), 202(3), 202(4), 202(5), and 202(6) are equidistant spaced apart by the inter-element distance d 190 as described in relation to FIG. 1. The MPAA 200 may direct its radiation in a broadside direction along a Z-axis 210 out of the X-Y plane 206 in a positive direction, in a negative direction into the X-Y plane 206, or along either the negative or positive directions of the Y-axis 204. In this example, it is assumed that the MPAA 200 is configured to direct its radiation pattern in the broadside direction along the positive direction of the Z-axis 210. In this example, the resulting radiation pattern will be scanned along an azimuth angle φ 212 between the X-axis 208 and Y-axis 204 and an elevation angle θ (not shown) along the Y-axis 204 and Z-axis 210.

Figure 3:
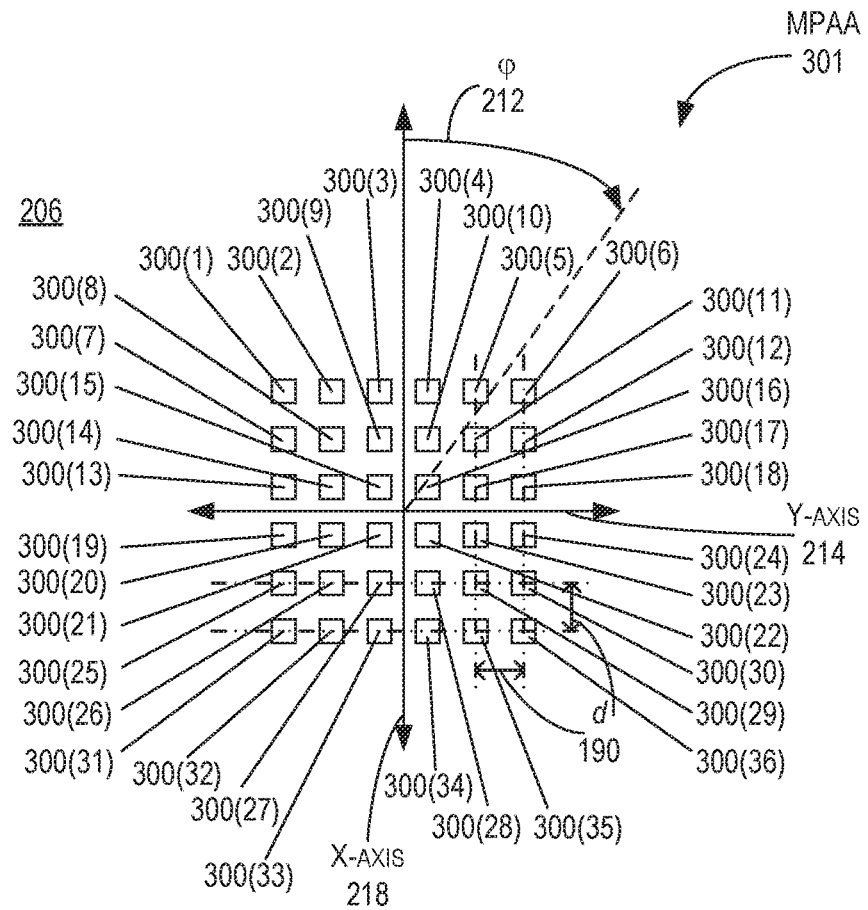
FIG. 3 is a top-view of an example of an implementation of an example of a planar (i.e., two-dimensional) MPAA.

In FIG. 3, a top-view of an example of an implementation of an example of a planar (i.e., two-dimensional) MPAA 301 is shown. Unlike the example shown in FIG. 2 with regards to MPAA 200, in this example, the MPAA 301 includes thirty six (36) radiating elements 300(1) through 300(36) along a Y-axis 204 in a X-Y plane 206 defined by the Y-axis 204 and an X-axis 208. Again, as discussed earlier, only six (36) radiating elements 300(1) through 300(36) are shown for the purpose of illustration but it is appreciated by those of ordinary skill in the art that the number radiating elements may vary from four to a large number (e.g., greater than a 1,000). In this example, all of the radiating elements 300(1) through 300(36) are equidistant spaced apart by the inter-element distance d 190 along both the X-axis 218 and Y-axis 214. It is appreciated that that inter-element distance may also optionally be unequal the X-axis 218 or along the Y-axis 214 to realize sparsely populated antenna array; however, for the purposes of simplicity the inter-element distance spacing in both the X-axis 218 and Y-axis 214 directions have been set to the same value equal to d 190. In this example, the resulting radiation pattern will be scanned along an azimuth angle φ 212 between the X-axis 208 and Y-axis 204 and in spherical coordinates, a polar (also known as an elevation) angle θ (not shown) along the Y-axis 204 and Z-axis 210.

In both the examples of MPAA 100 in FIGS. 2 and 3 (shown as MPAA 200 and MPAA 301, respectively), the individual radiating elements 202(1) through 202(6) or 300(1) through 300(36) may be, for example, generally known antenna radiators such as, for example, aperture antennas, micro-strip antennas, patch-antenna, dipoles, or other well know antenna radiator elements. As an example, each radiating element may be, or include, an antenna radiator that is an approximate isotropic radiator having an approximate constant directivity and configured to produce an approximate omnidirectional far-field radiation pattern. As in FIG. 1, in both FIGS. 2 and 3, each individual radiating element 202(1) through 202(6) or 300(1) through 300(36) may be either, or part of, a T/R module (as shown in FIG. 1) where each T/R module includes, inter alia, a phase-shifter and a power amplifier. The T/R modules may then be in signal communication with a controller (such as, for example, controller 104) that may be a beam-steering computer that may include hardware logic and/or a computer readable medium capable of storing software configured to excite the individual radiating elements 202(1) through 202(6) or 300(1) through 300(36), excite the plurality of radiating elements 202(1) through 202(6) or 300(1) through 300(36) with a phase taper, amplitude taper, or both, with a desired temporal and spectral profile, and produce a first radiation pattern having a main-beam in a first mode of operation, scan (i.e., steer) the main-beam of the first radiation pattern, produce a second radiation pattern having a second beam in a second mode of operation, and switching the MPAA 200 or MPAA 301 to operate in either the first mode of operation or the second mode of operation. In this example, the second beam is wider than the main-beam and the second radiation pattern is similar to a radiation pattern of a single radiating element of the plurality of radiating elements (i.e., 202(1) through 202(6) or 300(1) through 300(36)). Again, in this example, the single radiating element of the plurality of radiating elements 202(1) through 202(6) or 300(1) through 300(36) may be, or include, for example, an antenna radiator that is an approximate isotropic radiator having an approximate constant directivity and configured to produce an approximate omnidirectional far-field radiation pattern. Moreover, the summation of all the individual radiation patterns of the radiating elements produce both the first radiation pattern or second radiation pattern, where each radiating element of the plurality of radiating elements has a corresponding radiating element vector that includes a radiation pattern and polarization for the radiating element and the plurality of radiating elements has an array factor; however, in this example, the second radiation pattern includes an array factor that has approximately constant gain and is generally independent of both elevation and azimuth angle.

In order to better illustrate the properties of the first and second radiation patterns, FIGS. 4A, 4B, 5A, and 5B illustrate the polar and rectangular plots for the first and second radiation patterns. Specifically, in FIG. 4A, a plot of an example of an implementation of a polar plot 400 of a far-field radiation pattern for a generic antenna with high directivity is shown. The polar plot 400 includes a main-lobe 402 along a Z-axis 404 in the positive direction, a back-lobe 406 along Z-axis 404 in a negative direction, and side-lobes 408, 410, 412, and 414 along a positive and negative direction of a Y-axis 416 and angles between the X and Y axis 404 and 416. In this example, the main-lobe 402, back-lobe 406, and side-lobes 408, 410, 412, and 414 are spaced apart along a scanning angle θ 418 (i.e., the polar angle also known as the elevation angle) along an X-Y plane 420 defined by the Z-axis 404 and Y-axis 416. In this example, in a transmitting mode, the antenna has high directivity because most of the radiating energy is transmitted along the positive direction of the Z-axis 404 (herein referred to θ scanning angles 418 between, for example, −30 to 30 degrees from a reference 0 degrees scanning angles B 418 along the positive direction of the Z-axis 404) within the main-lobe 402 while only small portions of energy are radiated out in the other directions (i.e., other angles θ 418) covered by the back-lobe 406, and four side-lobes 408, 410, and 412. It is appreciated that the far-field radiation pattern shown in this example may be the far-field radiation pattern for an antenna that may be an individual antenna element or an antenna array based on the design of the antenna. As an example, the MPAA 100 may optionally produce a far-field radiation pattern that has a polar plot that is approximately similar to the polar plot 400 based on the predetermined design parameters of the MPAA 100 that include, for example, the number of radiating elements, the spacing between the radiating elements, the type of radiating elements, and the amplitude and phase taper utilized to excited the radiating elements. In the example of the MPAA 100 producing the far-field radiation pattern shown in FIG. 4A, the far-field radiation pattern may be the first radiation pattern having the main-beam 402 in the first mode of operation of the MPAA 100.

Figure 4B:
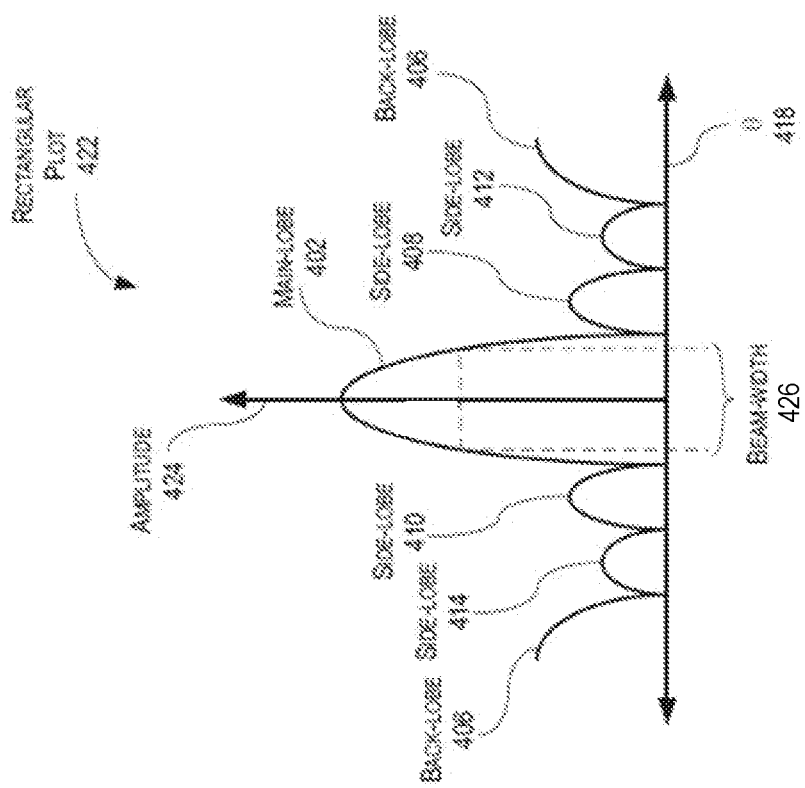
FIG. 4B is a rectangular plot of the polar plot of the far-field radiation pattern shown in FIG. 1A.
Figure 4A:
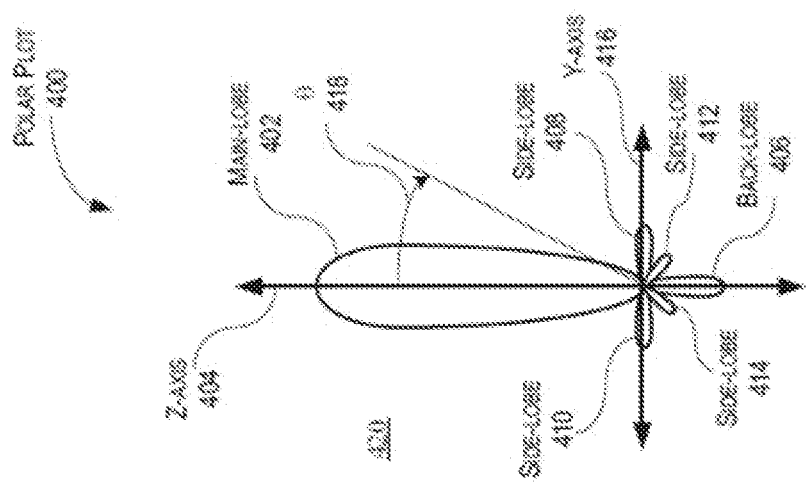
FIG. 4A is plot of an example of an implementation of a polar plot of a far-field radiation pattern for a generic antenna with high directivity.

In FIG. 4B, a rectangular plot 422 of the polar plot 400 of the far-field radiation pattern is shown. The rectangular plot 418 is a two-dimensional plot cut along the X-Yplane 420 showing the magnitudes (along an amplitude axis 424 in decibels ("dBs")) of the main-lobe 402, back-lobe 406, and four side-lobes 408, 410, 412, and 414 along the scanning angle θ 418. In this example, it is appreciated by those of ordinary skill in the art that the main-lobe 402 has a beam-width 426 defined as the distance between the −3 db points (along the plus and minus directions of the scan angle 418). In this example, the back-lobe 406 may be about −16 dB and the side-lobes 408, 410, 412, and 414 may be −30 dB or greater; however, it is appreciated that these values are purely examples and could vary significantly based on any utilization of excitation tapers and type, structure and configuration of the antenna. It is also appreciated that in this disclosure the terms "main-lobe" and "main-beams" may be utilized interchangeable.

Turning to FIG. 5A, a plot of an example of an implementation of a polar plot 500 of a far-field radiation pattern for an isotropic antenna radiator 502 (also known as an "isotropic radiator" or "point source") is shown. Unlike the polar plot 400 of FIG. 4A, the polar plot 500 does not include a main-lobe but instead radiates the same intensity of radiation in all directions. It is appreciated by those of ordinary skill in the art that an isotropic antenna radiator 502 is a theoretical point source of electromagnetic energy that has no preferred direction of radiation. By definition, the isotropic antenna radiator 502 radiates uniformly in all directions over a sphere centered on the isotropic antenna radiator 502. As such, in antenna theory, isotropic antenna radiators are used as reference radiators with which other antenna radiators are compared, for example in determining the gain of an antenna. As such, in antenna theory, the isotropic antenna radiator 202 is said to have a directivity of 0 dB in all directions. Similar to the example of FIG. 4A, the polar plot 500 that rotates through the scanning angle θ 418 between, for example, 0 to 360 degrees from the reference 0 degrees scanning angle θ 418 along the X-Y plane 420 defined by the Z-axis 404 and Y-axis 416.

In FIG. 5B, a rectangular plot 504 of the polar plot 500 of the far-field radiation pattern shown in FIG. 5A. In this example, the rectangular plot 504 is a two-dimensional plot cut along the X-Y plane 420 showing the magnitude (along the amplitude axis 424) of the far-field radiation pattern of the polar plot 500. In this example, it is appreciated by those of ordinary skill in the art that the magnitude of the rectangular plot 504 of the far-field radiation pattern of the polar plot 500 is constant 506 for all the scanning angles θ 418 from angle 0 degrees 508 to −180 degrees 510 and 0 degrees 508 to 180 degrees 512.

Figure 6B:
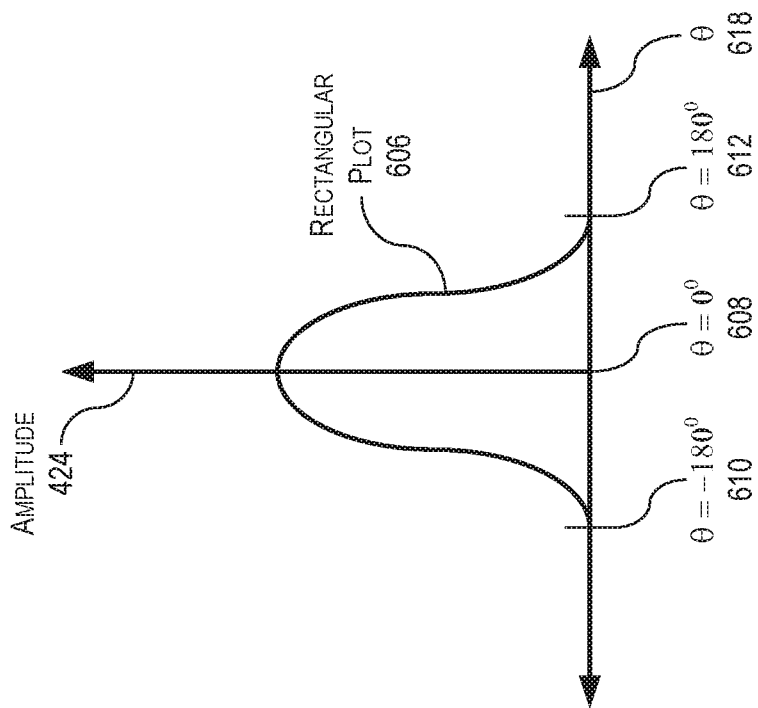
FIG. 6B is a rectangular plot of the polar plot of the far-field radiation pattern shown in FIG. 6A in accordance with the present disclosure.
Figure 6A:
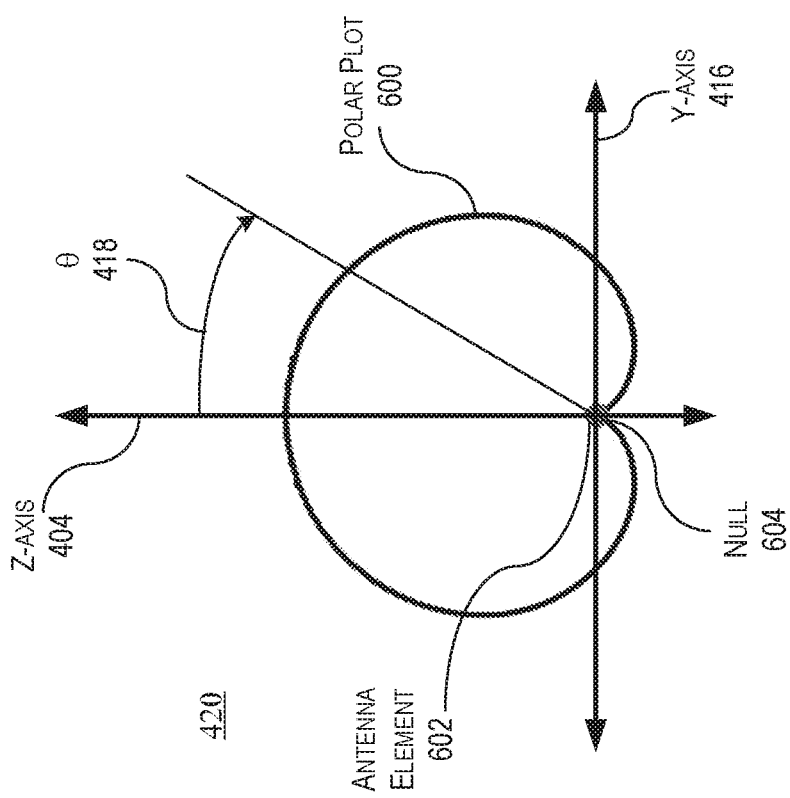
FIG. 6A is a plot of an example of an implementation of a polar plot of a far-field radiation pattern of an antenna element in accordance with the present disclosure.

Turning to FIG. 6A, a plot of an example of an implementation of a polar plot 600 of a far-field radiation pattern of an antenna element 602 is shown in accordance with the present disclosure. Similar to the example in FIG. 5A, the polar plot 600 does not include a main-lobe but instead radiates a cardioid intensity of radiation where most of the radiation radiated to the front of antenna element 602 in the positive Z-axis 404 at the scanning angle θ 418 equal to 0 degrees. The radiation pattern then gradually drops off from 0 dB to range of, for example, approximately −3 dB to approximately −6 dB from scanning angle θ 418 from angle 0 degrees to −90 degrees and 0 degrees to 90 degrees along the negative or positive direction on the Y-axis 416. The radiation pattern then quickly drops off from scanning angles θ 418 from angle −90 degrees to −180 degrees and 90 degrees to 180 degrees where at −180 (or 180 since it is the same scanning angle θ 418) the polar plot 600 radiation pattern drops to a null 604. Unlike, the example shown in FIG. 4A and similar to the example shown in FIG. 5A, the polar plot 600 of the far-field radiation pattern of the antenna element 602 shows that the far-field radiation pattern has low directivity from the reference 0 degrees scanning angle θ 418 along the X-Y plane 420 defined by the Z-axis 404 and Y-axis 416.

In FIG. 6B, a rectangular plot 606 of the polar plot 600 of the far-field radiation pattern shown in FIG. 6A in accordance with the present disclosure. In this example, the rectangular plot 606 is a two-dimensional plot cut along the X-Y plane 420 showing the magnitude (along the amplitude axis 424) of the far-field radiation pattern of the polar plot 600. In this example, it is appreciated by those of ordinary skill in the art that the magnitude of the rectangular plot 606 of the far-field radiation pattern of the polar plot 600 is approximately a sine wave between the scanning angle θ 418 from angle 0 degrees 608 to −180 degrees 610 and 0 degrees 608 to 180 degrees 612.

In this example, the polar plot 600 of the far-field radiation pattern of the antenna element 602 may be, for example, a microstrip antenna such as, for example, a patch antenna. In the example case of a patch antenna, the patch antenna may be about 25 millimeters ("mm") square on an approximately 70 to 100 mm ground plane square.

In this disclosure, the MPAA 100 may optionally produce a far-field radiation pattern that has a polar plot that is approximately similar to the polar plot 600 based on the predetermined design parameters of the MPAA 100 that again include, for example, the number of radiating elements, the spacing between the radiating elements, the type of radiating elements, and the amplitude and phase taper utilized to excited the radiating elements. In the example of the MPAA 100 producing the far-field radiation pattern shown in FIG. 6A, the far-field radiation pattern may be the second radiation pattern having the second beam that is approximately similar to the far-field radiation pattern of the polar plot 600 in the second mode of operation of the MPAA 100.

Turning back to FIG. 1, in an example of operation for receiving radio frequency ("RF") energy waves 192 that impinge on the MPAA 100, in addition to the spectrum, timing, amplitude and phase control imposed on each element 108, 110, 112, 114, 116, and 118 by the controller 104, there is a relative phase-shift between the RF energy waves 192 arriving at the elements 108, 110, 112, 114, 116, and 118 due to their positions in space and the angle of arrival of the RF energy wave 192. Furthermore, the far-field radiation pattern of each element 108, 110, 112, 114, 116, and 118 leads to a response that varies with the arrival angle of the incoming plane wave (i.e., RF energy waves 192). Since in this example, it is assumed that each element 108, 110, 112, 114, 116, and 118 is the same and produces the same type of far-field radiation pattern, it is appreciated by those of ordinary skill in the art that the principle of pattern multiplication allows the designers of the MPAA 100 to consider it as one multiplicative factor in the total far-field radiation pattern of the MPAA 100. As such, the remaining angular dependence of the far-field radiation pattern is known as the array factor, and the array factor is determined solely by the element positions and their excitations. It is also appreciated by those of ordinary skill in the art that in FIG. 1, the MPAA 100 is shown as in this example as a receiving phased array antenna; however, the receiving radiation pattern is the same as the transmitting far-field radiation pattern by reciprocity. Therefore, in this disclosure, the description and associated figures describing the MPAA 100 will be described as either the receiving or transmitting viewpoint depending upon which is more convenient.

As discussed earlier, the present disclosure describes exciting the plurality of elements 102 on the MPAA 100 such that the resulting radiation pattern of the MPAA 100 is radially distributed to resemble the antenna radiation pattern of a single radiator (i.e., element). This is performed and controlled with the controller 104 that performs a method that utilizes a three-dimensional form of the electromagnetic wave equation. It is appreciated by those of ordinary skill in the art that the electromagnetic wave equation is a second-order partial differential equation that describes the propagation electromagnetic ("EM") waves through a medium or in a vacuum and is a three-dimensional form of the wave equation derived from Maxwell's equations. For simplicity, in this example, the method approximates each elements 108, 110, 112, 114, 116, and 118 as a point source even though practical elements may not exhibit an omnidirectional radiation pattern. As such, in this example, the method assumes that a single element is present at array center of the MPAA 100 (e.g., the intersection point between the X-axis 208 and Y-axis 204). The signal element is also assumed to be an isotropic radiator or a virtual point source that has constant directivity, is broadband, and has an omnidirectional far-field radiation pattern. In general, the method utilizes Maxwell's derivation of the electromagnetic wave equation to describe the time varying fields measured at any spatial location around this element (which is assumed to be an isotropic radiator or virtual point source). The method then produces a far-field radiation pattern for the MPAA 100 that mimics (i.e., approximates) the single element utilizing the plurality of elements 108, 110, 112, 114, 116, and 118 as discrete radiating elements with known behaviors.

The method produces the far-field radiation pattern for the MPAA 100 utilizing a number of Bessel functions of the first kind of order n. In this example, the method may utilize a truncated regular series expansion of Bessel functions that may be approximated to the MPAA 100 array response. The method may then utilize a normalization constant for each element excitation (of the plurality of elements 108, 110, 112, 114, 116, and 118) to restrict the maximum (i.e., the allowable per the design of the MPAA 100) excitation amplitudes for each element of the plurality of elements 108, 110, 112, 114, 116, and 118. In this example, the net summation of all the plurality of elements 108, 110, 112, 114, 116, and 118 results in a constant gain curve radiation pattern similar to the single element. It is appreciated that the method may also utilize this technique generally for elements that are non-isotropic radiators.

In this example, the method utilizes the relationship that far-field radiation pattern of an antenna array of elements may be described as the product of the array element vectors and the array factor for the antenna array. In general, the element vectors encompass the radiation patterns and polarizations of the elements, while the array factor depends on the element spatial arrangements and entails the superposition of their excitations. In this example, the method manipulates the array factor of the MPAA 100 so that it behaves as a constant gain. As such, if the elements are similar, the resulting far-field radiation pattern is an amplified far-field radiation pattern that is similar to single elements.

Figure 7:
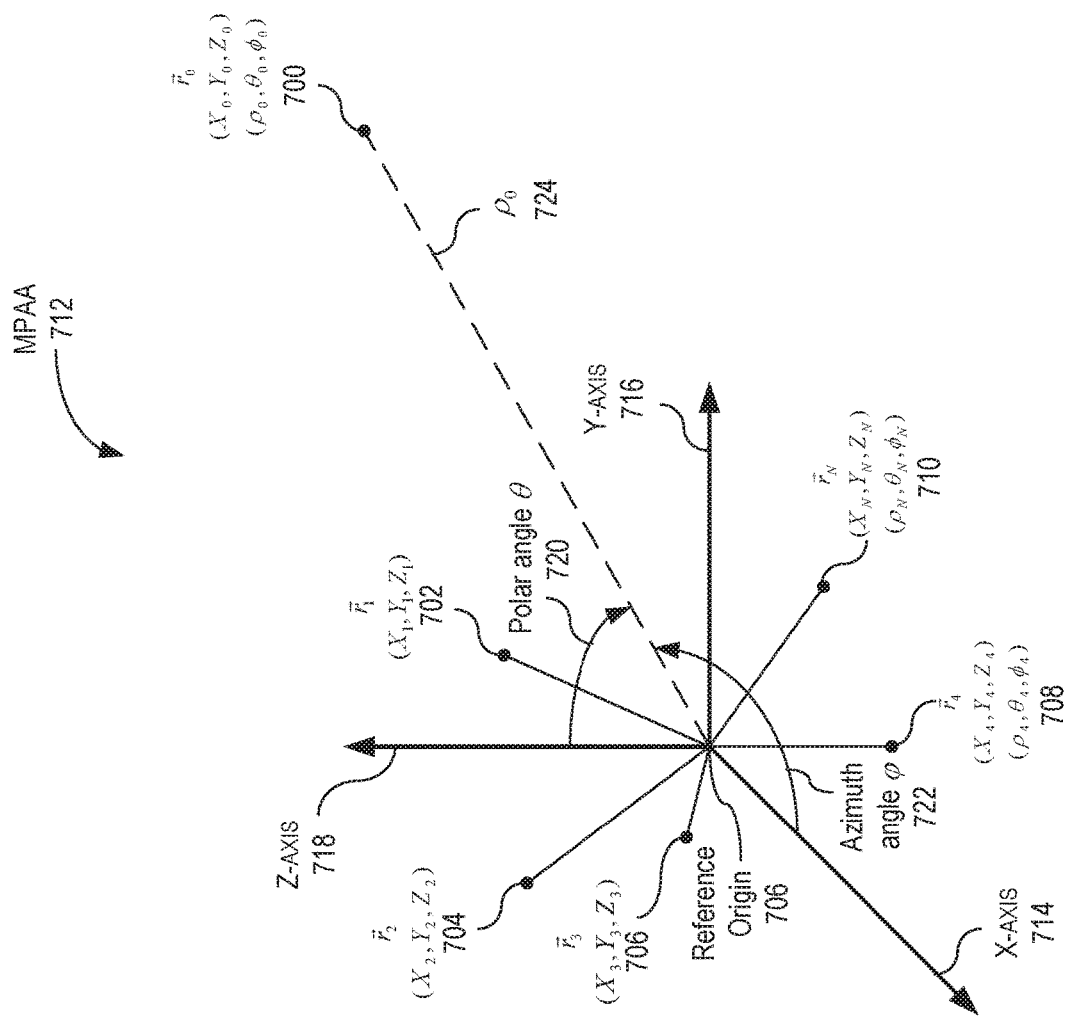
FIG. 7 is a graphical illustration of an example observation point in reference to a plurality of radiating elements in accordance with the present disclosure.

Turning to FIG. 7, a graphical illustration of an example observation point 700 is shown in reference to a plurality of radiating elements 702, 704, 706, 708, and 710 in a MPAA 712 in accordance with the present disclosure. In this example, the radiating elements 702, 704, 706, 708, and 710 are located at Cartesian locations $(X_i, Y_i, X_i)$ along the X-axis 714, Y-axis 716, and Z-axis 718 for i equal 1 to N, where N is the total number of radiating elements. In this example, the MPAA 712 may be the same type of MPAA shown in FIG. 1 as MPAA 100, FIG. 2 as MPAA 200, MPAA 300, or a conformal phased-array.

For purposes of simplicity, the method assumes initially that the MPAA 712 has infinitesimally small unit cell radiators (i.e., the radiating elements described earlier) that are distributed arbitrarily in space at locations $(x_i, y_i, z_i)$ or $(\rho_i, \theta_i, \phi_i)$ corresponding to position vectors $\vec{r}_i$, where $\rho_i$, $\theta_i$, $\phi_i$ represent the radial distance, polar angle 720, and azimuth angle 722 of the location in spherical coordinates. In this example, each of the elements i has a far-field radiation pattern $\vec{E}_i(\rho, \theta, \phi)$, assuming that each radiating element 702, 704, 706, 708, and 710 is measured at the reference origin 706 (i.e., the center of the array as described earlier) from the observation point 700 with the position vector $\vec{r}_0$ that corresponds to coordinate $(\rho_0, \theta_0, \phi_0)$. As such, the resulting far-field radiation pattern of these elements is $$\vec{E}(\rho, \theta, \phi) = \sum_{i=1}^{N} \vec{E}_i(\rho, \theta, \phi),$$

where $$\vec{E}_i(\rho, \theta, \phi) = (\hat{\alpha}_\theta \psi_i^\theta(\theta, \phi) + \hat{\alpha}_\phi \psi_i^\phi(\theta, \phi)) c_i \omega_i e^{-jk(\rho_0 - \vec{r}_i \cdot \vec{r}_0)}.$$

In this example, the unit vectors $\hat{\alpha}_\theta$ and $\hat{\alpha}_\phi$ point in the direction of increasing $\theta$ 720 and $\phi$ 722 respectively, the variables $\psi_i^\theta$ and $\psi_i^\phi$ represent the $\theta$ 720 and $\phi$ 722 components of the far-field radiation pattern, $k=2\pi/\lambda$ represents the wavenumber, $c_i$ represents the overall loss, gain, or both that includes the path loss and element gain, $\omega_i$ is a complex number representing weighting or excitation coefficient of the element, $j=\sqrt{-1}$, and the operator $(\cdot)$ is the inner product. The expression $\{\rho_0 - \vec{r}_i \cdot \vec{r}_0\}$ is in general the distance between each radiating element 702, 704, 706, 708, and 710 and the observation point 700. In this example, the relationship for the far-field radiation pattern $\vec{E}_i(\rho, \theta, \phi)$ has been split into $\theta$ 720 and $\phi$ 722 angular components so as to provide an option to apply the presented method approach and broaden the fields separately in $\theta$ 720 and $\phi$ 722. In this example, it is assumed that the observation point 700 is in far-field such that radial distance to the observation point 700 (shown as $\rho_0$ 724) is much greater than the wavelength of operation $\lambda$, which may be represented as $\rho_0$ 724$\gg\lambda$, and $\rho_0$ 724$\gg\max(|\vec{r}_i|)$, where i varies from 1 to N.

To simplify these mathematical derivations, the method assumes that $c_i = C = $ cte for all the radiating elements such that the relationship may be re-written as $$\vec{E}(\rho, \theta, \phi) = C e^{-jk\rho_0} (\hat{\alpha}_\theta \psi_i^\theta(\theta, \phi) + \hat{\alpha}_\phi \psi_i^\phi(\theta, \phi)) \sum_{i=1}^{N} \omega_i e^{jk\vec{r}_i \cdot \vec{r}_0},$$

where $$F_A(\theta, \phi) = \sum_{i=1}^{N} \omega_i e^{jk\vec{r}_i \cdot \vec{r}_0} = \sum_{i=1}^{N} \omega_i e^{jkl_i},$$

which is the array factor and $\vec{r}_i \cdot \vec{r}_0 = l_i(\theta, \phi)$ is a scalar. As such, this relation signifies the principle of pattern multiplication, where the overall array pattern may be described as the product of array factor and the element pattern as shown:

$$\vec{f}(\theta, \phi) = C e^{-jk\rho_0} (\hat{\alpha}_\theta \psi_i^\theta(\theta, \phi) + \hat{\alpha}_\phi \psi_i^\phi(\theta, \phi)),$$

which is purely a function of the element pattern, frequency, and distance. This may also be described by the following relationship $$\vec{E}(\rho, \theta, \phi) = \vec{f}(\theta, \phi) F_A(\theta, \phi),$$

which may be re-written as $$\vec{E}(\rho, \theta, \phi) = \vec{f}(\theta, \phi) \sum_{i=1}^{N} \omega_i e^{jkl_i}.$$

This may be re-written again because, as an example, the MPAA may be implemented as a uniform linear array with inter-radiating element spacing d where the reference origin 706 sits on the middle of MPAA. As such, the above relationship may be re-written as $$\vec{E}(\rho, \theta, \phi) = \vec{f}(\theta, \phi) \sum_{i=-M}^{M} \omega_i e^{jkidu},$$

where u equals $\sin\theta \cos\phi$ and M equals $(N-1)/2$.

In this disclosure the goal is to find a set of parameters and assumptions under which the second term $$\sum_{i=-M}^{M} \omega_i e^{jkidu}$$

appears constant because then the overall array response will mimic the shape of the element pattern response. Focusing on $\omega_i$ (i.e., the weightings of the radiating elements), a weighting is obtained such that the above summation becomes constant.

If an assumption is made that there are a large number of radiating elements in the MPAA and that a variable "x" is equal to $e^{jkdu}$ then the relationship may be as follows:

$$\lim_{M \to \infty} \sum_{i=-M}^{M} \omega_i e^{jkidu} = \lim_{M \to \infty} \sum_{i=-M}^{M} \omega_i x^i.$$

It is appreciated by those of ordinary skill in the art that the above equation becomes a Laurent series. With the choice of variable in x (e.g., $z = e^{-jkdu}$) other power series such as, for example, the Z-transform may also be utilized. It is appreciated that utilizing the Z-transform is helpful when considering different element geometries or to further manipulate the weights of each array. Moreover, the above relationship also allows the use of a discrete time Fourier transform and its identities and properties.

In this example, a truncated regular series expansion of Bessel functions for the EM field of a single point source will be utilized and equated it to the array response to calculate the approximate and optimal array radiating element excitations. A normalization constant for each radiating element excitation may also be considered to optionally restrict the maximum (i.e., the allowable) excitation amplitudes for each radiating element. More specifically, utilizing the Laurent series allows use of the identities of Bessel generating functions. Assuming $\omega_i = \varrho J_i(z)$, where $J_i(z)$'s are Bessel functions of the first kind, of order i (where i is an integer), and $\varrho$ is a constant coefficient that will be utilized for gain adjustment, the above expression may be re-written as follows $$\lim_{M\to\infty}\sum_{i=-M}^{M}\omega_i x^i = \varrho\lim_{M\to\infty}\sum_{i=-M}^{M}J_i(z)x^i,$$

where the parameter z is a degree of freedom. The above expression allows the use of Bessel's generating function (where it is known that x does not equal 0):

$$\lim_{M\to\infty}\sum_{i=-M}^{M}\omega_i x^i = \varrho\lim_{M\to\infty}\sum_{i=-M}^{M}J_i(z)x^i = \varrho e^{\left(\frac{z}{2}\right)\left(x-\frac{1}{x}\right)}.$$

Combining these expressions, the overall array pattern exhibits a similar and proportional response compared with each radiating element as shown by the following expression:

$$|\vec{E}(\rho,\theta,\phi)| = \left|\vec{f}(\theta,\phi)\sum_{i=-M}^{M}\omega_i e^{jkidu}\right| = \varrho\left|\vec{f}(\theta,\phi)e^{\left(\frac{z}{2}\right)\left(x-\frac{1}{x}\right)}\right| = \varrho|\vec{f}(\theta,\phi)|.$$

This final expression shows that the magnitude response of the overall array is frequency-independent that is in contrast with a general phased array that is frequency dependent for a given topology. In practice there are a finite number of elements, hence in this example the sum is truncated and is utilized to compensate for any truncation error. In this example the error term is $$\Delta(z,k,d,u) = \varrho\left(e^{\left(\frac{z}{2}\right)\left(e^{jkdu}-e^{-jkdu}\right)} - \sum_{i=-M}^{M}J_i(z)e^{jkdui}\right)$$

and $$\Delta(z,k,d,u) = \varrho\left(e^{jzsin(kdu)} - \sum_{i=-M}^{M}J_i(z)e^{jkdui}\right).$$

In other words, through numerical analysis, for a fixed geometry with fixed d and k, the error may be minimized by choosing a z value over azimuth or elevation scan angles θ and φ. In general, for a fixed array geometry and frequency of operation and a chosen z the error is deterministic because it can be compensated by "manageable" gain adjustments. As such, the approximately optimal choices for z may be calculated numerically for any array topology and may be chosen to reduce phase variation. Utilizing this process, the beam of the far-field radiation pattern may be broadened in azimuth, elevation, or both. It is appreciated by those of ordinary skill in the art that the same process may be utilized for a rectangular array, circular array, and planar array with a triangular lattice based on the pattern multiplication principle and can be expanded to three dimensional non-planar array topologies. Moreover, other choices of variables are possible in the above described expressions so as to result in a discrete time Fourier transform or Z-transform based approach that allows for manipulation of other array geometries. Furthermore, it is appreciated by those of ordinary skill in the art that while in this example similar radiating elements were utilized, the approach described is equally applicable to dissimilar radiating elements via hybrid synthesis by applying the superposition of the EM waves. In addition, when the elements are not equally spaced, or the array is not fully populated, the terms corresponding to those missing elements may be controlled or the orders, i, of Bessel functions of the first kind (i.e., the $J_i$ (z)'s) may be replaced to correspond to element distances in wavelengths from the reference origin 706 and then recalculate the element excitations and similarly adjust the gain $\varrho$, to reduce the error.

In this disclosure, the beam broadening efficiency, η, may be described as the ratio of the total power radiated by the MPAA given the newly calculated excitations, $P_{rad}$, to the maximum available power, $P_{acc}$, by the following expression:

$$\eta = P_{rad}/P_{acc} = |\vec{E}(\rho,\theta,\phi)|^2/N|\vec{f}(\theta,\phi)|^2 = \varrho^2/N$$

If the weight gain term $\varrho$ is increased, the efficiency favorably increases but at the cost of the scan angle error. Therefore, there is trade-off between efficiency and error. As the number of elements increases the radiation efficiency decreases. However a subset of elements can be grouped together to form sub-arrays. By assuming the radiation pattern of these subsets as unit cells, the same broadening methodology discussed in this disclosure can be applied to obtain a scalable implementation for arrays with larger number of elements.

Based on this methodology, the MPAA utilizes the approach to perform a method that widens the main-beam of the first radiation pattern produced by the MPAA. In general, the method includes exciting the plurality of radiating elements to produce a second radiation pattern, where the second radiation pattern is similar to a radiation pattern of a single radiating element of the plurality of radiating elements and where the second radiation pattern has the second beam that is wider than the main-beam. In this example, exciting the plurality of radiating elements generally includes switching (with the controller) between the first mode of operation that produces the first radiation pattern to the second mode of operation that produces the second radiation pattern.

In this example, exciting the plurality of radiating elements includes determining the plurality of excitation signals for the plurality of radiating elements and the plurality of excitation signals are determined by utilizing the truncated regular series expansion of Bessel functions for an EM field of the single radiating element and equating the truncated regular series expansion of Bessel functions for EM field to the array response for the MPAA.

Figure 8:
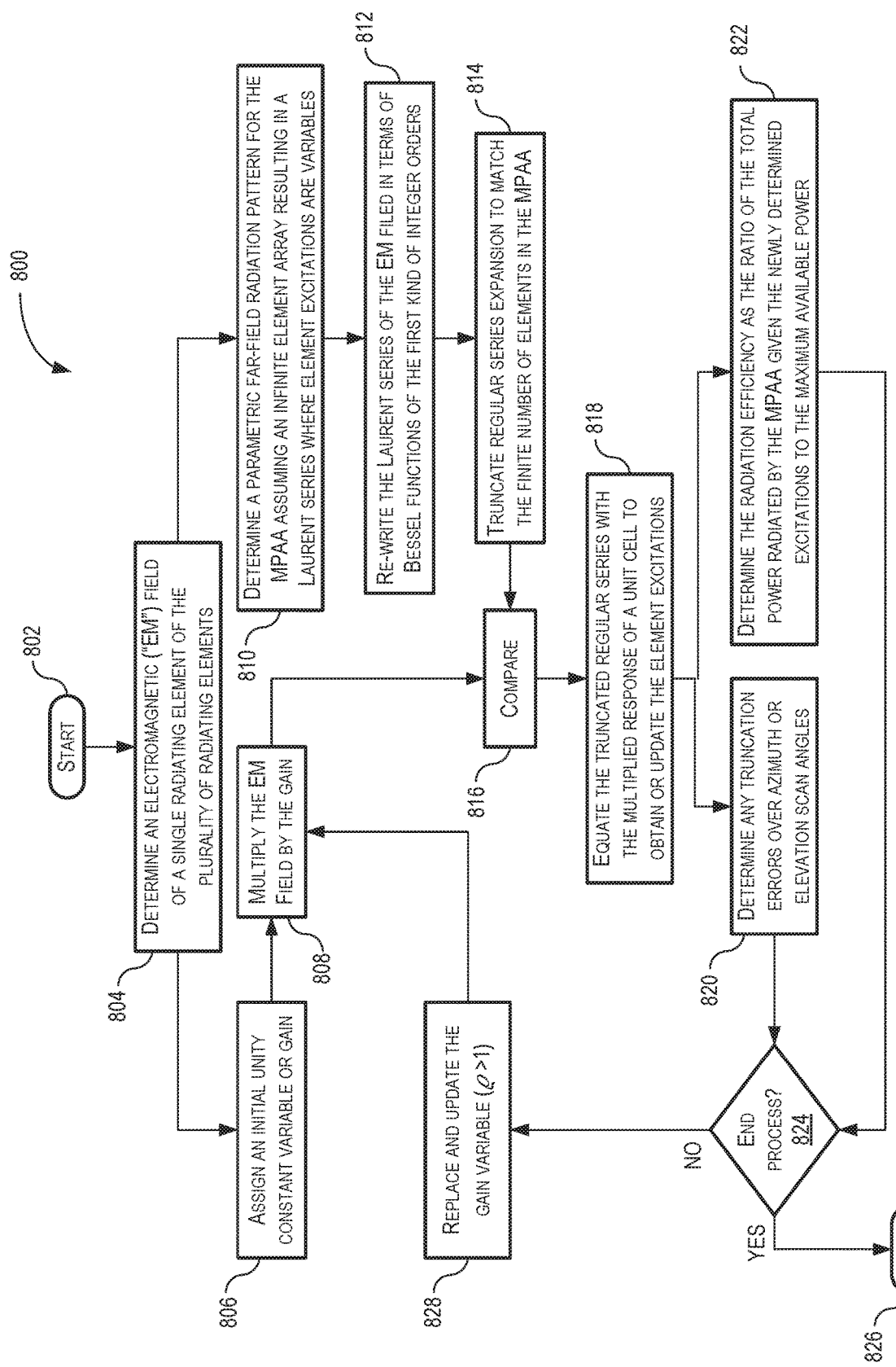
FIG. 8 is a flowchart of an example of an implementation of a method performed by the MPAA in accordance with the present disclosure.

More specifically, based on the above described approach, in FIG. 8 a flowchart 800 of an example of an implementation of a method performed by the MPAA is shown in accordance with the present disclosure. As described earlier, the method starts 802 by determining an EM field of a single radiating element of the plurality of radiating elements in step 804. The method then assigns an initial unity constant variable or gain to ensure stability of the method in step 806. The method then multiplies the EM field by the gain to obtain an amplified EM field in step 808. In step 810, the method then either subsequently, simultaneously with steps 806 or 808, or prior to steps 806 or 808, determines a parametric (i.e., varies with one or more independent variables known as parameters) far-field radiation pattern for the MPAA assuming that the MPAA has an infinite element array. This determination results in a regular series expansion (that may be a Laurent series), where the excitation values for the radiating elements of the MPAA are variables. In step 812, the method then maps (e.g., re-writes) the Laurent series of the EM field in terms of Bessel functions of the first kind of an order i, wherein i is an integer. The method then truncates the regular series expansion of the Bessel functions and equates (i.e., matches) the truncated regular series expansion so as to match the actual finite number of radiating elements in the MPAA in step 814. In this example, it is appreciated by those of ordinary skill in the art that once the truncated regular series expansion is determined, the necessary excitation signals (in both amplitude and phase) needed to excite the plurality of radiating elements to produce the second radiation pattern are known.

The method then compares (in step 816) the amplified EM field (produced in step 808) with the truncated regular series expansion (produced in step 814) and the comparison (e.g., the resulting difference if any) is passed to step 818. In step 818, the method equates the truncated regular series (e.g., the truncated Bessel functions of the first kind) with the amplified EM field, where the amplified EM field may be initially a multiplied response of a unit cell. In this example, the result is either the initial or updated element excitations for the radiating elements of the MPAA. The method then passes the initial or updated element excitations to both the steps 820 and 822. In step 820, the method determines any truncation errors over the azimuth or elevation scan angles and, in step 822, the method determines the radiation efficiency as the ratio of the total power radiated by the MPAA given the newly determined initial or updated element excitations to the maximum available power. The results are passed to decision step 824 where the method determines if the truncation errors (determined in step 820) and/or the determined radiation efficiency (determined in step 822) merit utilizing the determined initial or updated element excitations or whether further refinement in the initial or updated element excitations is needed. If the method determines (in decision step 824) that the determined initial or updated element excitations are acceptable for use in exciting the radiating elements, the method ends 826.

If, instead, the method determines in decision step 824 that the determined initial or updated element excitations are not acceptable for use in exciting the radiating elements, the method passes to step 828. In step 828, the method replaces and updates the gain value (i.e., $\varrho$) to compensate for any truncation errors, where the gain is greater than unity (i.e., the value 1). The update gain is then passed to step 808 where it is multiplied with the EM Field and the process repeats steps 816 through 824 until the proper determined initial or updated element excitations are acceptable for use in exciting the radiating elements and the method ends 826.

In this example method, it is assumed the MPAA is first operating in a first mode of operation where the plurality of elements of the MPAA are excited to produce a first radiation pattern that is typical of a phase array antenna—i.e., the first radiation pattern is very directive with a high directivity, a narrow main-beam, and a plurality of lower level sidelobes. As an example, the excitations of the plurality of radiating elements in the first mode of operation may utilize an array distribution taper that synthesizes the first radiation pattern to be directive and have a pre-determined side-lobe level performance. Examples of the array distribution may include, for example, an array distribution tapper synthesized utilizing a Dolph-Chebyshev linear array method or Taylor line source method.

When needed, the controller is configured to switch the operation of the MPAA to the second mode of operation so as to produce the second radiation pattern that has a much broader beam (i.e., wider) than the main-beam of the first radiation pattern. In the second mode of operation, the controller may perform steps 804 through 828 which results in exciting the plurality of radiating elements with the new excitation levels (i.e., determined initial or updated element excitations) so as to change the first radiation pattern to the second radiation pattern. In general, steps 804 through 828 may be performed optionally by the controller before operation of the MPAA or on-the-fly once the controller switches the operation of the MPAA from the first mode of operation to the second of operation.

Based on the approach described in this disclosure, it is noted that the approach also addresses potential round-off or quantization errors caused by known digital circuits that are utilized in conjunction with phased arrays. Specifically, phase, time, amplitude, and in some cases spectral control, in many modern phased array systems are performed by digital circuits. As an example, phase control may be performed utilizing digital phase shifters or amplitude control may be performed utilizing digital attenuators or digitally controlled operational amplifiers. Typically, these digital subsystems may introduce round-off or quantization errors due to the use of discrete steps in quantization and processing. In general, these discrete steps are due to the limited number of bits used in digital to analog (and vice versa) conversions.

As such, by utilizing the approaches described in this disclosure, the quantization effect are incorporated during the excitation calculation and optimization, where the target excitations are calculated based on the limitations and bounds in quantization capabilities. The previously described parameter z may be chosen such that the resulting element weights $\omega_i = \varrho\, J_i(z)$ sit exactly on or near the quantization steps.

For example when optimizing the excitations of 169 elements, where the first 39 excitations are listed in Table A, it is assumed that the amplitude control is limited to 4 bits (i.e., one hexadecimal digit) and phase control is limited to only one bit, (i.e., either 0 degree in phase shift or 180 degree in phase shift). Such constraints and limitations can be incorporated during optimizations in the same block, where the truncation error is calculated (i.e., step 820—determine any truncation error over azimuth or elevation scan angles).

Figure 9:
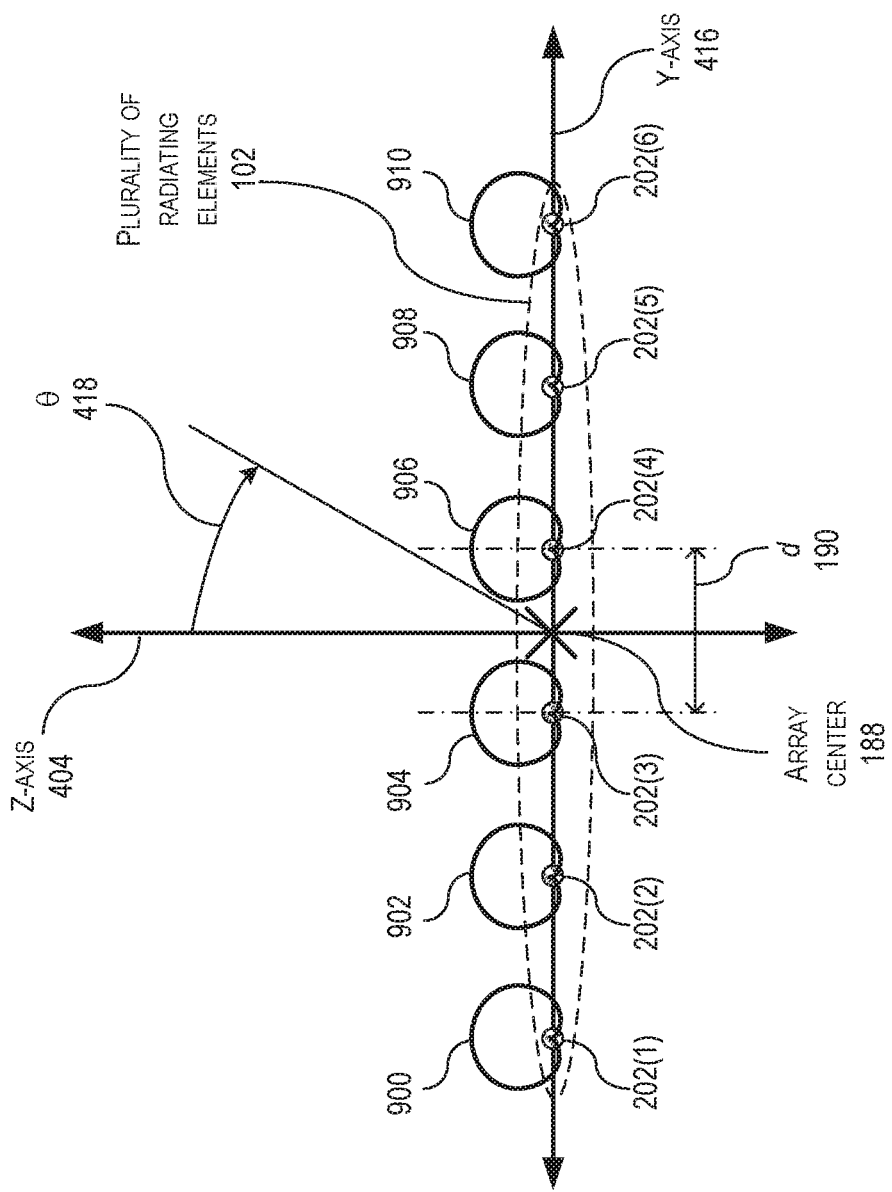
FIG. 9 is a plot of an example of an implementation of a plurality of polar plots of far-field radiation patterns of the plurality of radiating elements shown in FIG. 1 in accordance with the present disclosure.

Turning to FIG. 9, a plot of an example of an implementation of a plurality of polar plots 900, 902, 904, 906, 908, and 910 of far-field radiation patterns of the plurality of radiating elements 102 (shown in FIG. 1) is shown in accordance with the present disclosure. In this example, similar to the example in FIG. 1, only six (6) radiating elements 202(1), 202(2), 202(3), 202(4), 202(5), and 202(6) are shown but it is appreciated by those of ordinary skill that this is for ease of illustration only and there may be optionally a large number of radiating elements. As in the example described in relation to FIG. 1, in this example the six radiating elements 202(1), 202(2), 202(3), 202(4), 202(5), and 202(6) are shown as being symmetrically arranged around and centered on the array center 188 where each radiating element pair is spaced apart by the inter-element spacing d 190. In this example, the radiating elements may be patch antennas that produce individual far-field radiation patterns that are cardioid in shape (similar to the polar plot 600 shown in FIG. 6A).

Figure 10:
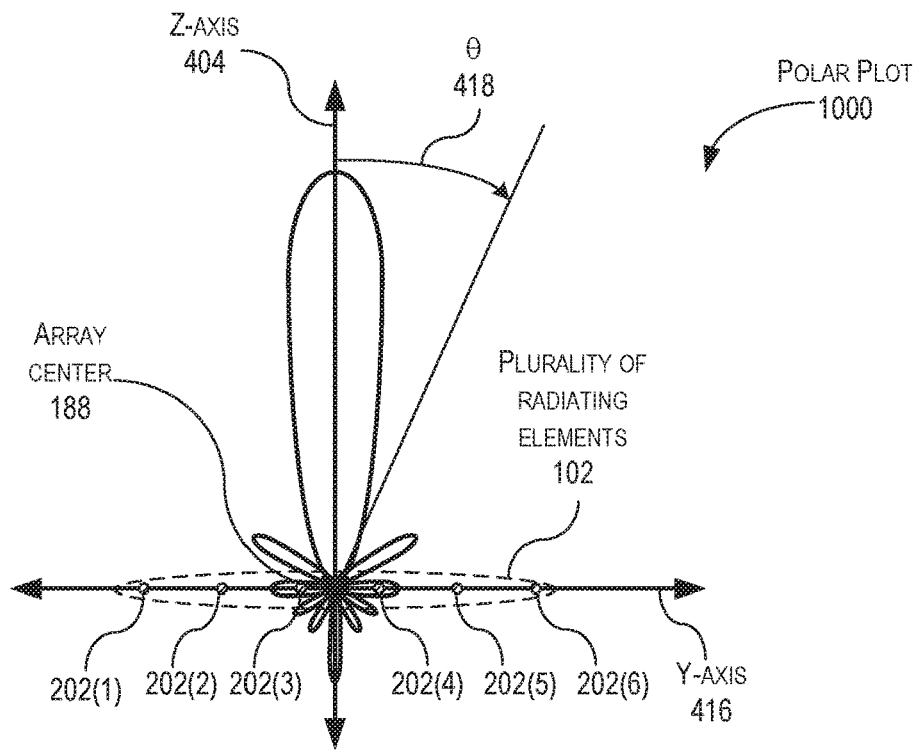
FIG. 10 is a plot of an example of an implementation of a polar plot of a combined directive far-field radiation pattern of the plurality of radiating elements shown in FIGS. 1 and 9 in accordance with the present disclosure.

In FIG. 10, a plot of an example of an implementation of a polar plot 1000 of a combined directive far-field radiation pattern of the plurality of radiating elements 102 (shown in FIGS. 1 and 9) is shown in accordance with the present disclosure. In this example, the combined directive far-field radiation pattern 1000 is an example of the first far-field radiation pattern of the first mode of operation (as described earlier).

Additionally, the excitations of the plurality of radiating elements 102 in the first mode of operation may utilize an array distribution taper that synthesizes the combined directive far-field radiation pattern 1000 to be directive and have a pre-determined side-lobe level performance. Again, examples of the array distribution may include, for example, an array distribution tapper synthesized utilizing a Dolph-Chebyshev linear array method or Taylor line source method.

Figure 11:
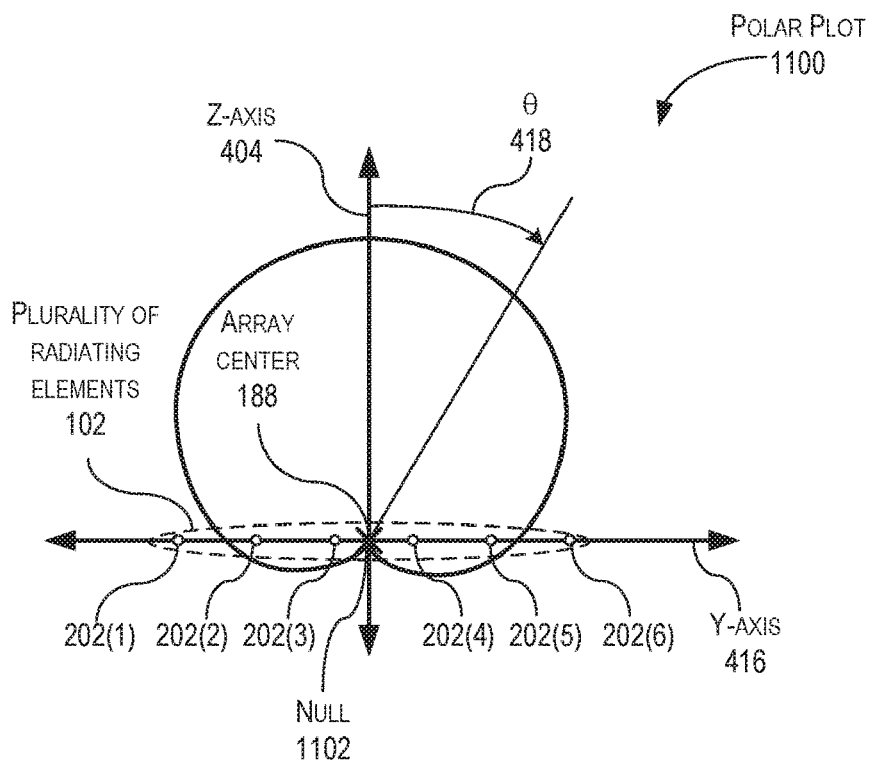
FIG. 11 is a plot of an example of an implementation of a polar plot of an ideal combined non-directive far-field radiation pattern of the plurality of radiating elements shown in FIGS. 1 and 9 in accordance with the present disclosure.

Turning to FIG. 11, a plot of an example of an implementation of a polar plot 1100 of an ideal combined non-directive far-field radiation pattern of the plurality of radiating elements (shown in FIGS. 1 and 9) is shown in accordance with the present disclosure. In this example, the reason that the polar plot 1100 is of an ideal combined non-directive far-field radiation pattern is that the plurality of radiating elements 102 is assumed to be an infinite or almost infinite plurality of radiating elements 102 organized as a linear array (even though for purposes of ease of illustration only six radiating elements 202(1), 202(2), 202 (3), 202(4), 202(5), and 202(6) are shown). In this example, the ideal combined non-directive far-field radiation pattern is an example of the second far-field radiation pattern of the second mode of operation (as described earlier). In this example, similar to the example in FIG. 6A, the polar plot 1100 does not include a main-lobe but instead radiates a cardioid intensity of radiation where most of the radiation is radiated to the front of radiating elements 202(1), 202(2), 202(3), 202(4), 202(5), and 202(6) (i.e., broadside) in the positive Z-axis 404 at the scanning angle θ 418 equal to 0 degrees. The combined non-directive far-field radiation pattern then gradually drops off from 0 dB to range of, for example, approximately −3 dB to approximately −6 dB from scanning angle θ 418 from angle 0 degrees to −90 degrees and 0 degrees to 90 degrees along the negative or positive direction on the Y-axis 416. The combined non-directive far-field radiation pattern then quickly drops off from scanning angles θ 418 from angle −90 degrees to −180 degrees and 90 degrees to 180 degrees where at −180 (or 180 since it is the same scanning angle θ 418) the polar plot 1100 radiation pattern drops to a null 1102. In this example, the ideal combined non-directive far-field radiation pattern is synthesized by the excitations of the plurality of radiating elements 102 that are determined utilizing the regular series expansion of Bessel functions described earlier.

Figure 12:
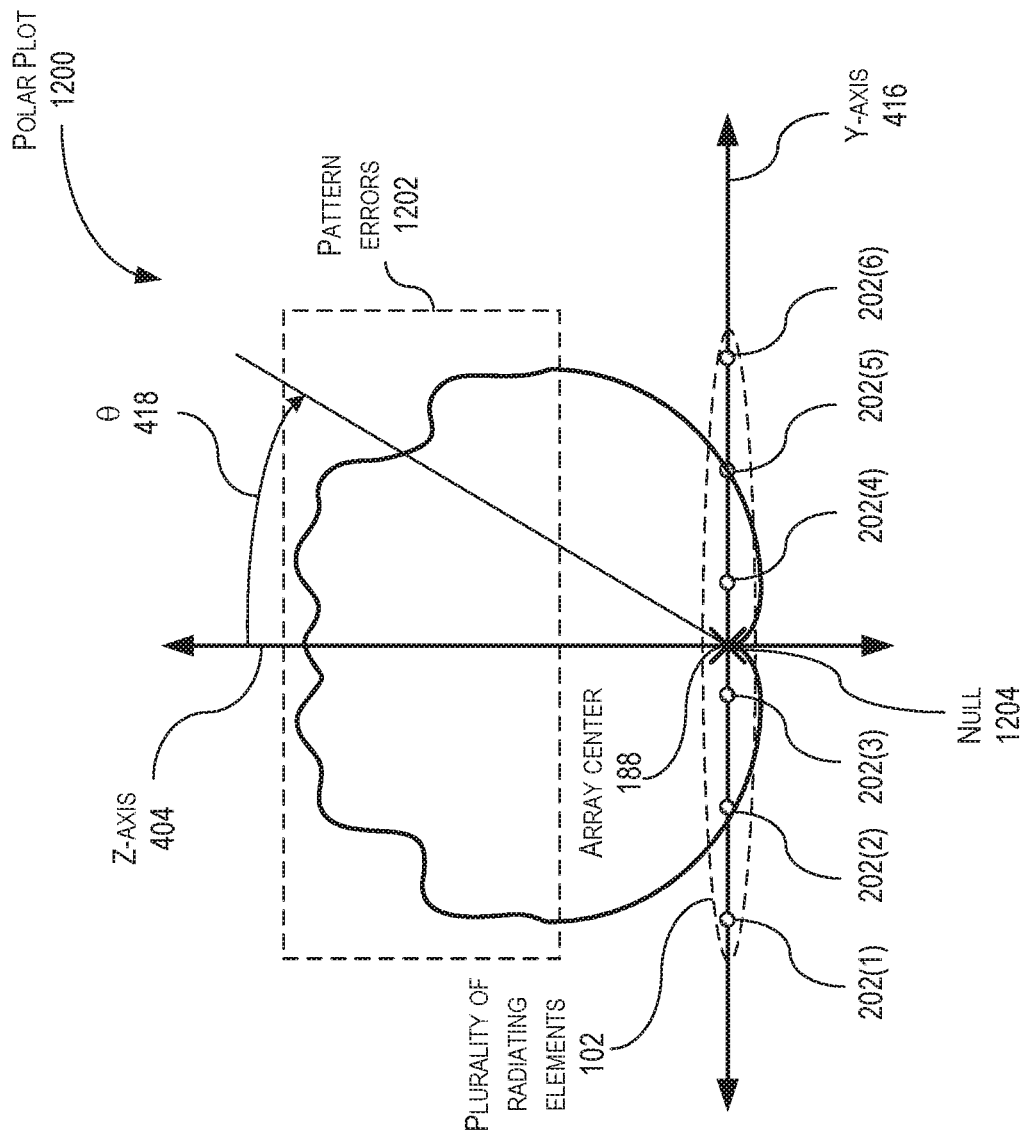
FIG. 12 is a plot of an example of an implementation of a polar plot of a non-ideal combined non-directive far-field radiation pattern of the plurality of radiating elements shown in FIGS. 1 and 9 in accordance with the present disclosure.

In FIG. 12, a plot of an example of an implementation of a polar plot 1200 of a non-ideal combined non-directive far-field radiation pattern of the plurality of radiating elements 102 (shown in FIGS. 1 and 9) is shown in accordance with the present disclosure. In this example, the polar plot 1200 of a non-ideal combined non-directive far-field radiation pattern is similar to the polar plot 1100 of an ideal combined non-directive far-field radiation pattern except that the polar plot 1200 of a non-ideal combined non-directive far-field radiation pattern includes pattern errors 1202 that are caused in part by finite and small number of the plurality of radiating elements 102 in the PAA. Again, in this example, the non-ideal combined non-directive far-field radiation pattern is an example of the second far-field radiation pattern of the second mode of operation (as described earlier). It is appreciated that as the number of radiating elements in the plurality of elements 102 is increased the "ripple" of the pattern errors 1202 will decrease. As an example of an implementation, the following table A shows the corresponding calculated excitation coefficients for the first 39 elements of a rectangular array example with 169 elements. In this example, the first, second, and third columns are x, y, and z of the radiating elements coordinates along the X-axis, Y-axis, and Z-axis, respectively. The fourth and fifth columns are the calculated amplitudes in hexadecimal digits and phase angles weighting values in degrees for exciting the plurality of radiating elements 102 utilizing the above described method. In this example it is assumed that there are 169 radiating elements even though for purposes of illustration only six (6) radiating elements 202(1), 202(2), 202(3), 202(4), 202(5), and 202(6) are shown in FIG. 12.

TABLE A

| X-coordinate (mm) | Y-coordinate (mm) | Z-coordinate (mm) | 4-bit amplitude weight (hexadecimal) | 1-bit phase weight (degrees) |
|---|---|---|---|---|
| 0 | 0 | 0 | 2 | 0 |
| 50 | 0 | 0 | 4 | 180 |
| 100 | 0 | 0 | 5 | 0 |
| 150 | 0 | 0 | 5 | 180 |
| 200 | 0 | 0 | 1 | 0 |
| 250 | 0 | 0 | 4 | 0 |
| 300 | 0 | 0 | 2 | 180 |
| 350 | 0 | 0 | 4 | 180 |
| 400 | 0 | 0 | 1 | 0 |
| 450 | 0 | 0 | 5 | 0 |
| 500 | 0 | 0 | 5 | 0 |
| 550 | 0 | 0 | 4 | 0 |
| 600 | 0 | 0 | 2 | 0 |
| 0 | 50 | 0 | 4 | 180 |
| 50 | 50 | 0 | 7 | 0 |
| 100 | 50 | 0 | B | 180 |
| 150 | 50 | 0 | A | 0 |
| 200 | 50 | 0 | 1 | 180 |
| 250 | 50 | 0 | 9 | 180 |
| 300 | 50 | 0 | 5 | 0 |
| 350 | 50 | 0 | 9 | 0 |
| 400 | 50 | 0 | 1 | 180 |
| 450 | 50 | 0 | A | 180 |
| 500 | 50 | 0 | B | 180 |
| 550 | 50 | 0 | 7 | 180 |
| 600 | 50 | 0 | 4 | 180 |
| 0 | 100 | 0 | 5 | 0 |
| 50 | 100 | 0 | B | 180 |
| 100 | 100 | 0 | 10 | 0 |
| 150 | 100 | 0 | F | 180 |
| 200 | 100 | 0 | 2 | 0 |
| 250 | 100 | 0 | D | 0 |
| 300 | 100 | 0 | 7 | 180 |
| 350 | 100 | 0 | D | 180 |
| 400 | 100 | 0 | 2 | 0 |
| 450 | 100 | 0 | F | 0 |
| 500 | 100 | 0 | 10 | 0 |
| 550 | 100 | 0 | B | 0 |
| 600 | 100 | 0 | 5 | 0 |

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A multi-mode phased array antenna having at least two modes of operation, wherein a first mode of operation generates a first radiation pattern having a main-beam and at least one secondary beam, and wherein a second mode of operation generates a second radiation pattern having a second beam, the multi-mode phased array antenna comprising:
    a plurality of radiating elements positioned about a center point; and
    a controller in signal communication with each of the plurality of radiating elements, wherein the controller is configured to switch between the first mode of operation and the second mode of operation, and wherein the controller is configured to excite the plurality of radiating elements to generate:
        the first radiation pattern having the main-beam and the at least one secondary beam in the first mode of operation, wherein main-beam is substantially symmetric about a radiation axis oriented through the center point, and wherein the main-beam is directed substantially in a first direction along the radiation axis, and
        the second radiation pattern having the second beam in the second mode of operation, wherein the second beam is wider than the main-beam and is directed substantially in a radial direction from the center point, and wherein the second beam defines a substantially cardioid or spherical shaped pattern symmetric about the radiation axis.

2. The multi-mode phased array antenna of claim 1, wherein the plurality of radiating elements comprises an array of radiating elements having an array center positioned at the center point, and wherein the second radiation pattern is representative of an amplified radiation pattern of a single radiating element located at the array center.

3. The multi-mode phased array antenna of claim 1, wherein the second radiation pattern has a substantially uniform directivity pattern.

4. The multi-mode phased array antenna of claim 1, wherein the controller is further configured to determine an array factor to generate the second radiation pattern, and wherein the array factor has a substantially constant gain.

5. The multi-mode phased array antenna of claim 1, wherein each radiating element of the plurality of radiating elements is configured to have a radiating element radiation pattern, and wherein a summation of all of the radiating element radiation patterns of each radiating element of the plurality of radiating elements results in the second radiation pattern.

6. The multi-mode phased array antenna of claim 1, wherein each radiating element of the plurality of radiating elements comprises a transmit/receive module.

7. The multi-mode phased array antenna of claim 6, wherein each transmit/receive module includes a phase-shifter and a power amplifier.

8. The multi-mode phased array antenna of claim 1, wherein each radiating element of the plurality of radiating elements comprises a radiator.

9. The multi-mode phased array antenna of claim 8, wherein each radiator comprises a patch antenna.

10. The multi-mode phased array antenna of claim 1, wherein the controller comprises a beam-steering computer.

11. The multi-mode phased array antenna of claim 1, wherein each radiating element of the plurality of radiating elements has a corresponding element vector, wherein the second radiation pattern is generated based on multiplying the element vector of each radiating element with an array factor, wherein the array factor has a substantially constant gain.

12. The multi-mode phased array antenna of claim 1, wherein the second radiation pattern has a null in a second direction opposite the first direction.

13. The multi-mode phased array antenna of claim 1, wherein the controller is configured to excite the plurality of radiating elements by determining a plurality of excitation signals for the plurality of radiating elements, and wherein the plurality of excitation signals are determined based on a truncated regular series expansion of Bessel functions for an electromagnetic field.

14. The multi-mode phased array antenna of claim 13, wherein the Bessel functions comprise Bessel functions of the first kind of an order i, wherein i is an integer.

15. The multi-mode phased array antenna of claim 13, wherein the regular series comprises a Laurent series.

16. A method for beam generation by a multi-mode phased array antenna, the multi-mode phased array antenna having a plurality of radiating elements positioned about a center point, the method comprising:
    initiating, via a controller, first excitation of the plurality of radiating elements to generate a first radiation pattern having a main-beam and at least one secondary beam, wherein the main-beam is substantially symmetric about a radiation axis oriented through the center point, and wherein the main-beam is directed substantially in a first direction along the radiation axis; and
    switching, via the controller, to second excitation of the plurality of radiating elements to generate a second radiation pattern, wherein the second radiation pattern has a second beam that is wider than the main-beam and is directed substantially in a radial direction from the center point, and wherein the second beam defines a substantially cardioid or spherical shaped pattern symmetric about a radiation axis oriented through the center point.

17. The method of claim 16, further comprising switching, via the controller from the second excitation of the plurality of radiating elements to the first excitation of the plurality of elements to return to the first radiation pattern.

18. The method of claim 16, wherein the second excitation of the plurality of radiating elements includes determining a plurality of excitation signals for the plurality of radiating elements, and wherein the plurality of excitation signals are determined based on a truncated regular series expansion of Bessel functions for an electromagnetic field.

19. The method of claim 18, wherein the Bessel functions comprise Bessel functions of the first kind of an order i, wherein i is an integer, and wherein the regular series is a Laurent series.

20. The method of claim 18, wherein the Bessel functions comprise Bessel functions of the first kind of an order i, corresponding to radiating element distances in wavelength from the center point.

* * * * *